G. D. POGUE.
DRIVING MECHANISM.
APPLICATION FILED OCT. 26, 1916.
1,225,355.
Patented May 8, 1917.
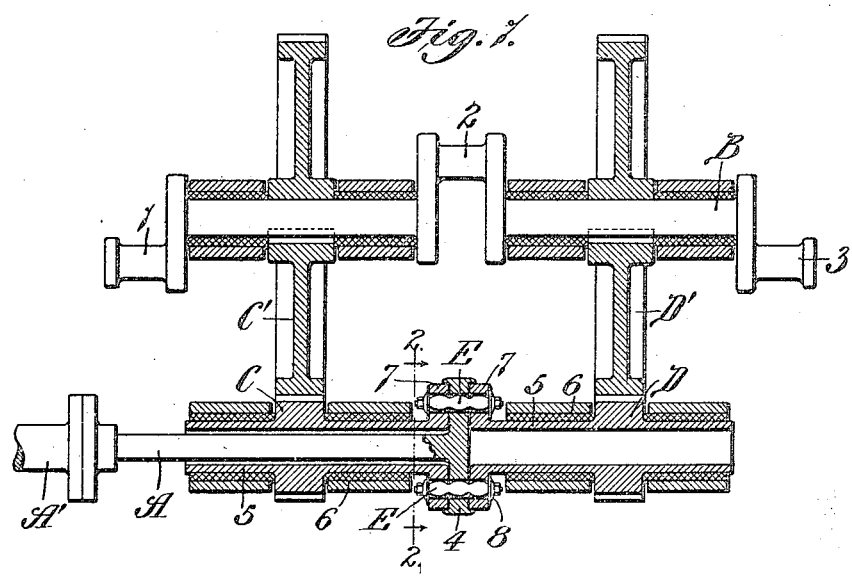
Inventor,
George D. Pogue.
By Bakewell & Chree Attys.

PATENT OFFICE.

GEORGE D. POGUE, OF ST. LOUIS, MISSOURI.

DRIVING MECHANISM.

1,225,355.   Specification of Letters Patent.   Patented May 8, 1917.

Application filed October 26, 1916. Serial No. 127,819.

*To all whom it may concern:*

Be it known that I, GEORGE D. POGUE, a citizen of the United States, residing at St. Louis, Missouri, have invented a certain new and useful Improvement in Driving Mechanisms, of which the following is a full, clear, and exact description, such as will enable others skilled in the art to which it appertains to make and use the same.

This invention relates to a driving mechanism of the type that comprises a drive shaft provided with a plurality of pinions or gears that mesh with coöperating toothed members on a driven shaft.

In triplex power pumps and other machines in which the crank shaft is connected through gearing to a drive shaft it has been found desirable to use two sets of coöperating gears or gears and pinions arranged at widely separated points along the length of the two shafts in order to secure greater symmetry in design and also to distribute the stresses on the crank shaft equally or more uniformly. If the coöperating gears and pinions, the shafts, the keys, the keyways and the supporting structure are accurately machined and assembled, the two sets of gears will operate smoothly and in perfect synchronism when running idle, but when a load is applied to the machine, the torsional stresses and other stresses tend to produce deflections which result in unequal work as between the two sets of gears and also to subject the shafts, particularly the crank shaft, to abnormal strains.

One object of my invention is to provide a driving mechanism of the general type referred to which is so constructed that an equal distribution of work as between the different sets of gears is insured at all times when the driven machine is in operation.

Another object is to provide a driving mechanism of the general character referred to that is smooth and quiet in operation, the mechanism being so constructed that slight inaccuracies in the machining and assembling of the coöperating parts are compensated for.

Another object is to provide a driving mechanism which is so constructed that it is not necessary to use a flexible coupling between the drive shaft of the mechanism and the motor or engine that actuates said drive shaft, when the motor is arranged in close proximity to the driving mechanism.

Another object is to provide an equalizing device for gearing, which is so constructed that the coöperating parts of same are free to move sufficiently to compensate for inaccurate machining or torsional deflection without liability of producing noise, due to back lash.

And still another object is to provide a driving mechanism in which two driving pinions or gears are equipped with relatively long hubs that are connected to a laterally-projecting portion or flange on a drive shaft that lies substantially midway between said pinions, thus avoiding the undesirable result of having one pinion receive its power through a shaft of sufficient length to admit of torsional deflection which causes an angular deflection or "lag" in said pinion, as generally occurs in the type of driving mechanism heretofore in use, in which two driving pinions arranged at widely separated points on a drive shaft are rigidly connected or keyed to the drive shaft. Other objects and desirable features of my invention will be hereinafter pointed out.

Figure 1 of the drawings is a longitudinal sectional view of a driving mechanism constructed in accordance with my invention.

Fig. 2 is an enlarged transverse sectional view, taken on the line 2—2 of Fig. 1.

Figs. 3 and 4 are sectional views, taken on the lines 3—3 and 4—4, respectively, of Fig. 2; and Fig. 5 is a perspective view illustrating a drive flange of slightly different form than the one illustrated in Figs. 1 to 4.

Referring to the drawings which illustrate the preferred form of my invention, A designates a drive shaft, B designates a driven shaft, C and D designate two driving pinions and C' and D' designate two gears on the driven shaft B that mesh with said driving pinions C and D, respectively, the driven shaft herein shown consisting of a crank shaft provided with three crank arms 1, 2, and 3, between which the gears C' and D' are arranged. The drive shaft A is preferably rigidly connected to the drive shaft A' of an engine or motor (not shown), so that it virtually forms an extension of the drive shaft of the motor that actuates the mechanism, and said drive shaft A is connected with the pinions C and D in such a manner that an equal distribution of work as between the two sets of coöperating pinions and gears will be insured at all times, even though the load on the different crank arms on the driven shaft varies considerably.

In the preferred form of my invention, as herein shown, the drive shaft A is provided with a laterally-projecting portion or drive member 4 that is arranged substantially midway between the pinions C and D and which is connected to said pinions in such a manner that the pinions can turn slightly relatively to the drive shaft and relatively to each other. The pinions C and D are spaced a considerable distance apart, and while it is immaterial, so far as my broad idea is concerned, how said pinions are mounted, I prefer to provide said pinions with relatively long hubs 5 that are journaled in longitudinally alined bearings 6, which hubs are provided at their inner ends with flanges 7 that lie on opposite sides of the laterally-projecting portion 4 on the drive shaft A. Said drive shaft extends through the hub of the pinion C, and the portion 4 on said drive shaft to which the pinions are connected preferably consists of a disk on the inner end of the drive shaft.

In the form of my invention herein shown the flanges 7 on the hubs of the driving pinions are connected to the drive member arranged between same by a plurality of pins E that project transversely through holes or openings in said flanges and drive member or portion 4, as shown in Figs. 3 and 4, said pins E being of such shape that they can rock in said holes sufficiently to permit the flanges 7 and the driving pinions connected to same to turn circumferentially slightly with relation to the driving member 4, thus producing an equalizing device that insures equal distribution of work as between both sets of pinions and gears at all times when the driven machine is in operation; that compensates for slight inaccuracies in machining and assembling of parts, and thus produces a driving mechanism that is smooth and quiet in operation; and which effectively eliminates the undesirable results of torsional stresses and other stresses in the drive shaft and driven shaft. I prefer to provide the equalizing device with means that holds the coöperating parts of same in sufficiently intimate contact with each other to avoid noise, due to back lash, and at the same time, leave said parts reasonably free to move and thus compensate for inaccurate machining or torsional deflection, and while various means may be used for this purpose, I prefer to use a means of the character herein illustrated which consists of heavy spring washers 8 mounted on externally screw-threaded extensions 9 on the pins E in such a manner that the inner sides of the flanges 7 on the hubs of the driving pinions will be clamped tightly against the opposite faces or sides of the drive member or disk 4, each of said spring washers being held in place by a nut 10 mounted on the externally screw-threaded extension that passes through the washer. The openings in the flanges 7 and in the drive member 4, through which the pins E pass, are preferably lined with hardened steel bushings 11, and each of the pins E is provided with three substantially spherical-shaped portions $x$ so as to enable said pins to rock freely. If desired, the drive member 4 can be provided on its opposite sides with plates 12 of bronze or some other suitable material, so as to avoid cutting of the drive member 4 and the flanges 7 with which it coöperates, and also insure good frictional contact between said parts. Instead of providing the drive member 4 with round holes for the pins E, slots 13 can be formed in the periphery of said drive member to receive the pins E, as shown in Fig. 5, and if desired, a stop or stops 14 may be employed for limiting the relative circumferential movement of the flanges 7 and the drive member 4 when the mechanism is in operation. In the form of my invention herein shown the drive member 4 is provided with a plurality of stops consisting of horizontally-disposed pins that project into elongated slots or holes 15 in the flanges 7, thereby permitting the disks 7 to turn slightly with relation to the drive member 4, but preventing said parts from becoming unbalanced or damaged in case one of the flanges 7 is slow to pick up, when the mechanism is in operation.

When the mechanism is in operation both sets of pinions and gears will do an equal amount of work, irrespective of where the load is applied to the crank shaft. When the center crank arm 2 is under load, the pins E will assume a position parallel to the longitudinal axis of the drive shaft A, because the two sets of pinions are arranged on opposite sides of said crank arm and offer the same resistance to the forward movement of the drive disk 4. In other words, a load on the center crank arm will be distributed equally to both of the gears C' and D' and will cause both of the pinions C, D to offer an equal resistance to the forward turning movement of the drive member 4 between the flanges on the hubs of said pinions, thereby causing the driving power to be applied equally to both of the driving pinions. When the crank arm 1 is under load, the pins E assume an angular position with relation to the longitudinal axis of the drive shaft, or, in other words, move into the position shown in Fig. 4, on account of the greater strain that is applied to the drive pinion C, due to its close proximity to the portion of the crank shaft B that is subjected to load, but in assuming this position, the pins E force the pinion D forwardly slightly in the direction of rotation of the drive member E, so as to cause the teeth of the pinion D to exert a greater forward strain on the teeth of its coöperating gear D'. Likewise, when the crank arm 3 is subjected to a load, the pinion D tends to lag sufficiently with relation to the forward movement of the drive member 4 to cause the pins E to rock in the opposite direction and force the pinion C forwardly slightly in the direction of rotation of the drive member 4, so as to cause the teeth on the pinion C to exert a greater forward strain on the teeth of its coöperating gear C'. While I have stated that the pins E assume a position parallel to the longitudinal axis of the drive shaft A, when the center crank arm 2 is under load, this, of course, is true only when the coöperating parts of the mechanism are accurately machined and alined, an ideal condition that rarely exists in actual practice. I have described the mechanism in this manner, however, for the purpose of trying to bring out the fact that when both of the gears C' and D' are subjected to an equal load the flanges 7 will not turn relatively to the drive member, and that when one of said gears is subjected to a greater load than the other gear, this additional load will immediately result in a change in the relative position of the flanges 7 and the drive member 4 and cause the pinion that coöperates with the gear which is not under so great a load to exert substantially the same driving power on said gear that the other pinion exerts on its coöperating gear.

In addition to the desirable features above pointed out, a driving mechanism of the construction herein illustrated makes it possible to arrange the driving motor or engine in close proximity to the mechanism without using a flexible coupling between the motor shaft and the drive shaft of the mechanism, owing to the fact that the drive shaft A is of sufficient length to flex slightly without injury, and thus compensate for inaccuracies in the alinement of the driving and driven machines.

Having thus described my invention, what I claim, and desire to secure by Letters Patent, is:

1. A driving mechanism, comprising a drive shaft provided with a laterally-projecting portion, driving members having flanges arranged on opposite sides of said portion, a device rockably mounted in the laterally-projecting portion on said drive shaft and projecting into openings in said flanges, resilient means for clamping said flanges tightly against the portion on the drive shaft which they embrace, and an independent means for limiting the circumferential movement of said flanges with relation to the laterally-projecting portion on the drive shaft.

2. An equalizing device for gearing, comprising a substantially disk-shaped driving member, parts arranged on opposite sides of said member, transversely-disposed pins having substantially spherical-shaped portions that fit in openings in said member and parts, and spring washers on said pins that exert pressure on said parts and hold them tightly against said member.

3. An equalizing device for gearing, comprising a substantially disk-shaped driving member, parts arranged on opposite sides of said member, transversely-disposed pins having substantially spherical-shaped portions that fit in openings in said member and parts, and stops in said member that project into elongated openings in said parts.

GEORGE D. POGUE.